Patented Jan. 11, 1949

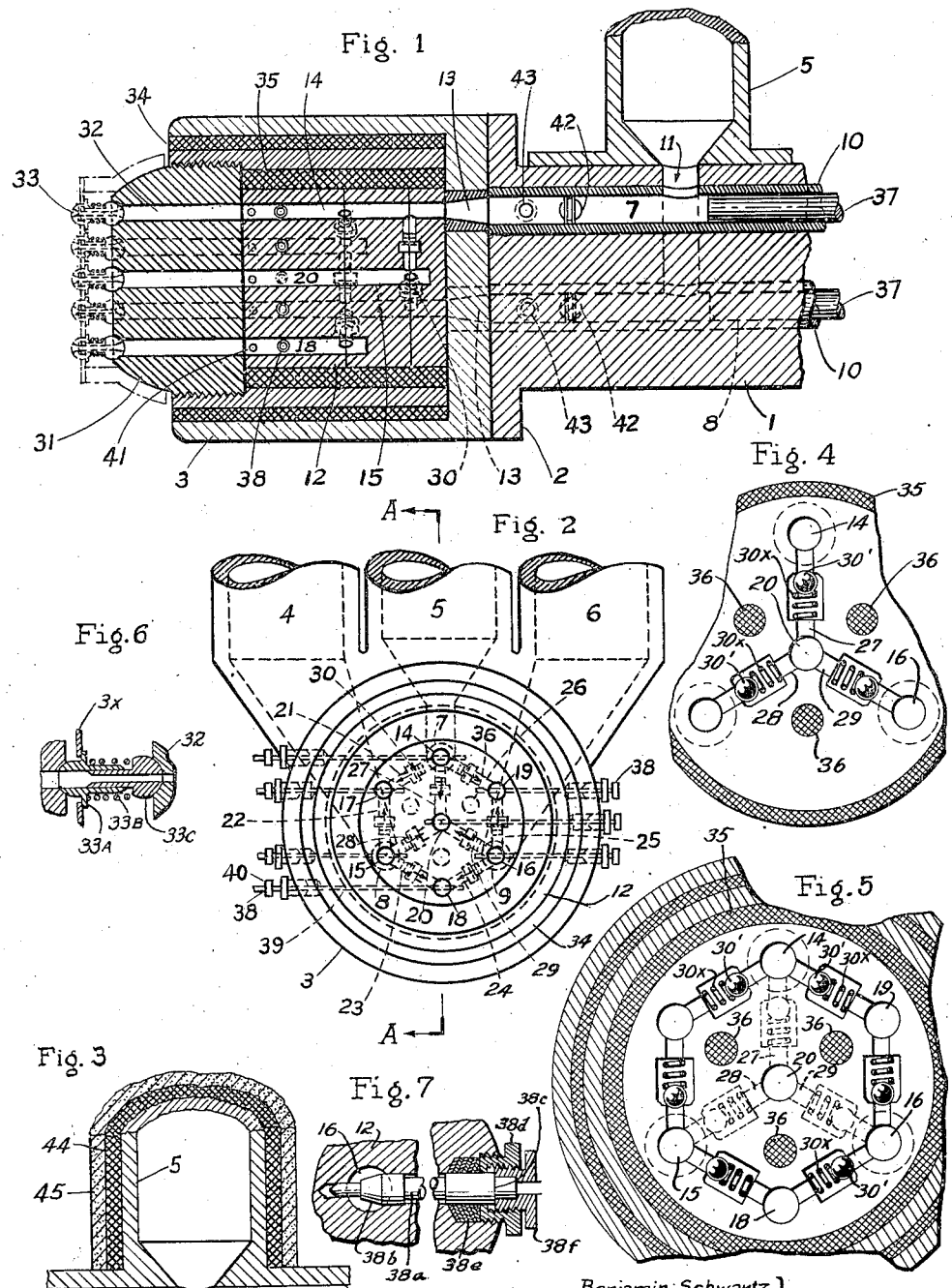

2,459,048

UNITED STATES PATENT OFFICE 2,459,048

MOLD INJECTION HEAD

Benjamin Schwartz and Eugene H. Schwartz, Brooklyn, N. Y.

Application April 25, 1946, Serial No. 664,804

12 Claims. (Cl. 18—30)

This invention relates generally to a new type of mold injection head or extrusion head.

A primary object of the present invention is to provide an injection head that will simultaneously inject a plurality of colors into a mold for forming a design, pictured article or product.

Another object is to provide an injection head for flooding a mold simultaneously with a plurality of fusible colored materials or metal or alloys without allowing such materials to become fused or mixed.

Another object is to provide an injection head adapted to inject simultaneously into a mold a plurality of separate quantities of different colored plastic material, or quantities of different colored molten glass or quantities of different metal or alloys of metals.

A specific object is to provide an injection head adapted to inject simultaneously into a mold a plurality of quantities of plastic materials having different primary colors together and a plurality of quantities of such materials having different secondary colors, the secondary colored materials being formed or mixed while en route through the injection head to the mold.

Another specific object is to provide an injection head adapted to inject simultaneously into a mold a plurality of quantities of molten glass having different primary colors and a plurality of quantities of such material having different secondary colors, the secondary colored materials being formed or mixed while enroute through the injection head to the mold.

Another specific object is to provide an injection head adapted to inject simultaneously into a mold a plurality of quantities of different metals or alloys and quantities of mixed metals and alloys.

Another object of the invention is to provide an extrusion head capable of extruding simultaneously a plurality of quantities of plastic materials having different primary colors together and a plurality of quantities of such materials having different secondary colors.

Another object is to eliminate the necessity for providing a number of separate molding operations in order to produce a design having different colors.

Another object is to provide an injection head that is simple in construction, inexpensive to manufacture and easily cleaned.

Other objects and advantages of the invention will be apparent from the description thereof to follow taken in connection with the accompanying drawing in which—

Fig. 1 is a longitudinal sectional view of an injection head embodying the present invention taken on the plane of the line A—A of Fig. 2.

Fig. 2 is an end view of the apparatus shown in Fig. 1.

Fig. 3 is a fragmentary detail sectional view of a modified form of reservoir.

Fig. 4 is a cross-sectional view, on an enlarged scale, along the plane of the line c—c of Fig. 1.

Fig. 5 is a cross-sectional view, on an enlarged scale, through the branch openings.

Fig. 6 is a sectional detail view of one of the nozzles.

Fig. 7 is a sectional detail view on an enlarged scale, through one of the branch openings.

The improved apparatus comprises a cylindrical casting 1 having an annular flange 2 to which is fastened in any suitable manner a hollow extension shell 3. A number of reservoirs or hoppers 4, 5 and 6 are suitably supported on top of the casting 1.

The casting is formed with a number of radially spaced channels or passages 7, 8 and 9 extending therethrough and each passage may be provided with a liner 10 formed of suitable lining material. The interior of each reservoir is tapered at its bottom to facilitate flow of the material and each reservoir communicates with a separate channel in the casting, by means of an opening leading from the interior of the reservoir through the casting wall and liner into the channel.

For example, reservoir 5 communicates with channel 7 by means of such an opening 11. Reservoir 4 communicates with channel 8 and reservoir 6 communicates with channel 9 through similar openings 11.

Each reservoir contains a supply of fusible material, such as plastic material, for example, having a primary color different from the color of the material in the other reservoirs. For example, reservoir 4 may have material colored blue, reservoir 5 material colored red and reservoir 6 material colored yellow. The material may flow out of the reservoirs and through the openings 11 into the channels by gravity or it may be forced out under pressure.

Mounted in the hollow shell 3 is a cylinder 12 and formed in the base 3' of said shell 3 are a number of passages 13 communicating with the channels 7, 8 and 9 which passages may have liners similar to those of the channels.

The cylinder 12 is formed with a number of radially spaced passages 14, 15 and 16 which communicate with the channels 7, 8 and 9, respectively, through the passages 13 in the base of the extension 3. These passages 14, 15 and 16 extend through the cylinder and are smaller in diameter than the channels 7, 8 and 9, respectively, the walls of the passages 13 in the shell extension 3 being tapered to register with such passages in the cylinder.

Another series of radially disposed secondary channels or openings 17, 18 and 19 are formed in the cylinder 12 and disposed between the passages 14, 15 and 16. These channels do not extend through the cylinder 12 from end to end but end at a point remote from the inner end thereof. A similar channel or opening 20 is disposed in the center or axially of the cylinder and extends inwardly of the cylinder to a greater distance than the channels 17, 18 and 19. A branch opening 21 extends between passage 14 in cylinder 12 and the secondary passage 17 and a similar branch opening 22 extends between passage 15 and said secondary passage 17. A similar branch opening 23 extends between the passage 15 and the secondary passage 18 and a similar branch opening 24 between the passage 16 and said secondary passage 18. Passage 16 communicates with secondary passage 19 through branch opening 25 and passage 14 communicates with said secondary passage 19 through a branch opening 26. The passages 14, 15 and 16 communicate with the central passage 20 by means of branch openings 27, 28 and 29, respectively. A one-way check valve 30 is interposed in each of said branch openings. Such a valve is shown in Fig. 4 consisting of a ball member 30' held in closed position against its seat by a spring 30x. The ball is adapted to be displaced by flow of material but the direction of flow cannot be reversed as the ball will prevent this.

The outer end of the cylinder is recessed to receive a screw threaded head member 31. This head member is formed with a number of radially disposed spaced passages 32 extending therethrough and equal in number to the number of passages in the cylinder 12 and disposed directly in line with and communicating with said latter passages at the inner end of said passages 32. In the outer end of each of said passages 32 is an adjustable nozzle 33.

In Fig. 6, such a nozzle is shown as formed with telescopic tubular bodies 33a and 33c, each provided with a spherical head and with a helical spring 32c interposed between said heads. The spherical heads and spring enable the nozzle to adjust itself and ensure good contact with the injection head and master plate thereby preventing leakage.

Annular heating elements 34 and 35 are positioned in the cylinder 12 around the passages therein and other heating elements 36 are radially disposed around the central channel 20.

A plunger or piston 37 is slidably mounted in each of the channels 7, 8 and 9 in the casting 1 and is moved therethrough by any suitable means. The plungers are adjustable in any suitable manner so that they may be regulated to feed the necessary amount of material to fill the mold.

Extending laterally through openings in the cylinder 12 are a number of combined mixing and flow regulating devices 38, one such device being provided for each passage in the cylinder and each device comprising a stem member 39 extending through an opening in the cylinder and through its respective passage and carrying a rotatable member in the passage and being suitably formed at its outer end as at 40 for manual or automatic rotation. The mixing may also be accomplished by electrically operated devices or by chemical substances.

The mixing means is shown in Fig. 7 and consists of a shaft 38a having vanes 38b at one end and a pulley (not shown) at the other end connected to any suitable source of power for turning it. A stuffing box device is mounted in the conduit and comprises the usual nut 38d and washers 38e. An adjusting screw 38f engages shoulders 38g on the shaft for regulating the flow of material in the conduit.

Each of the passages 14 to 19, inclusive, in the cylinder may be provided with a lateral opening 41 for insertion of a pressure or temperature instrument (not shown).

Each of the channels 7, 8 and 9 may also be provided with a shut-off valve 42 and a compressed air inlet 43 for shutting off the supply of material from the reservoirs and for blowing air through the injection head for cleaning the same.

In Fig. 3 an annular heating element 44 is shown around the outer wall of a reservoir 5 and the heater element is surrounded by insulating material 45.

In operation, the material such as plastic material in the reservoirs having the different primary colors passes downwardly into the respective channels 7, 8 and 9 where such material is compressed by the slidable plungers 37 and liquefied, if not already liquid, and forced outwardly through said channels into the communicating passages 14, 15 and 16, respectively. The material contained in the reservoir 5 will pass into and through channel 7, passage 14 and out through the aligned passage 32 in the head 31 and through the nozzle 33 of said passage 32. Similarly the material in reservoir 4 will pass downwardly into and through channel 8, passages 15 and 32 and through the nozzle in passage 32; and similarly the material in reservoir 6 will pass down into and through the channel 9 and passages 16 and 32 to and through the nozzle in the passage 32.

Part of the material with the primary color, for instance red, from reservoir 5 that passes through passage 14 is forced through the branch opening or passage 21 and through the valve 30 therein into the secondary color passage 17; and similarly the colored material that passes from reservoir 4, for instance blue, through passage 15 is branched off through branch opening 22 into the same passage 17 whereby a secondary color is produced and this material with the secondary color is forced outwardly through the passage 32 in the head 31 and through its nozzle 33.

In the same way, the material from reservoir 4 is branched off from passage 15 through branch opening 23 and its valve 30 into the secondary passage 18; and likewise the material with the primary color such as yellow from reservoir 6 that passes through channel 9 and passage 16 is branched off into said passage 18 by means of the branch opening 24 whereby material with a secondary color is produced in said passage 18 and forced outwardly through passage 32 and its nozzle 33.

The material with the primary colors in both channels 7 and 9 for instance colors red and yellow, respectively, pass through branch openings 26 and 25, respectively, and their valves into the secondary passage 19 to produce a material with a secondary color which material is forced through said passage 19 and aligned passage 32 and nozzle 33. The material in the secondary passages 17, 18 and 19 are thoroughly mixed by the mixing devices 38.

The materials with the primary colors in the channels 7, 8 and 9 also pass through the branch lines 27 into the central secondary passage 20 where they are mixed and forced outwardly through said passage 20 and its aligned passage 32 and nozzle 33.

The material passing outwardly through the nozzles 33 is injected into a mold for producing an ornamental multicolored design such as disclosed in copending application Serial Number 515,117.

We claim:

1. A mold injection head comprising a casting having a plurality of spaced channels formed therein and extending therethrough, a plurality of reservoirs supported on said casting, each of said reservoirs having an opening in its bottom, said casting having openings communicating with the openings in said reservoirs, a plunger in each of said channels, a hollow shell having a closed base at its inner end and an open outer end secured to one end of said casting and forming an extension thereof, the base of said shell having openings communicating with the channels in said casting, a cylinder within the shell having main passages extending longitudinally therethrough and communicating with the channels in the casting through the openings in the base of the shell and having secondary passages leading to the outer end of the cylinder and with branch passages connecting the main passages with the respective secondary passages and a head member in the outer end of said shell having passages extending therethrough and communicating with the passages in the cylinder.

2. A mold injection head as defined in claim 1 characterized by nozzles in the outer ends of the passages in the head member.

3. A mold injection head as defined in claim 1 characterized by valves in the branch passages in the cylinder that connect the main passages with the secondary passages.

4. A mold injection head as defined in claim 1 characterized by nozzles in the outer ends of the passages in the head member and valves in the branch passages in the cylinder that connect the main passages with the secondary passages.

5. A mold injection head as defined in claim 1 characterized by mixing and flow regulating devices in the passages in the cylinder.

6. A mold injection head as defined in claim 1 characterized by shut-off valves and compressed air inlets in the channels for cleaning the injection head.

7. A mold injection head as defined in claim 1 characterized by lateral openings in the passages in the cylinder for receiving testing tools.

8. A mold injection head as defined in claim 1 characterized by reservoirs having heating elements therearound and heat insulators around said heating elements.

9. A mold injection head as defined in claim 1 characterized by nozzles in the outer ends of the passages in the head member, valves in the branch passages in the cylinder that connect the main passages with the secondary passages, mixing and flow regulating devices in the passages in the cylinder and shut-off valves and compressed air inlets in the channels for cleaning the injection head.

10. A mold injection head comprising a casting having a plurality of spaced channels formed therein and extending therethrough, a plurality of reservoirs supported on said casting, each of said reservoirs having an opening in its bottom, said casting having openings communicating with the openings in said reservoirs, a plunger in each of said channels, a hollow shell having a closed base at its inner end and an open outer end secured to one end of said casting and forming an extension thereof, the base of said shell having openings communicating with the channels in said casting, a cylinder within said shell having main passages extending longitudinally therethrough and communicating with the channels in the casting through the openings in the base of the shell and a head member in the outer end of said shell having passages extending therethrough and communicating with the passages in the cylinder.

11. A mold injection head as defined in claim 10 characterized by nozzles in the outer ends of the passages in the head member, flow regulating devices in the passages in the cylinder and shut-off valves and compressed air inlets in the channels for cleaning the injection head.

12. A device of the kind described comprising a casting having a plurality of spaced channels formed therein and extending therethrough, a plurality of reservoirs supported on said casting, each of said reservoirs having an opening in its bottom, said casting having openings communicating with the openings in said reservoirs, a plunger in each of said channels, a hollow shell having a closed base at its inner end and open at its outer end secured to one end of said casting and forming an extension thereof, the base of said shell having openings communicating with the channels in said casting, a cylinder within the shell having main passages extending longitudinally therethrough and communicating with the channels in the casting through the openings in the base of the shell and having secondary passages leading to the outer end of the cylinder, said secondary passages communicating with a plurality of main passages and a head member in the outer end of said shell having passages extending therethrough and communicating with the passages in the cylinder.

BENJAMIN SCHWARTZ.
EUGENE H. SCHWARTZ.

REFERENCES CITED

The following references are of record in the file of this patent:

UNITED STATES PATENTS

| Number | Name | Date |
| --- | --- | --- |
| 1,952,241 | Eckert | Mar. 27, 1934 |
| 2,162,563 | Oldham | June 13, 1939 |
| 2,203,620 | Smith | June 4, 1940 |
| 2,226,408 | Nast | Dec. 24, 1940 |